Oct. 7, 1969  F. SHORT  3,470,924
MACHINE FOR NOTCHING PALLET STRINGERS
Filed Aug. 27, 1965  3 Sheets-Sheet 1
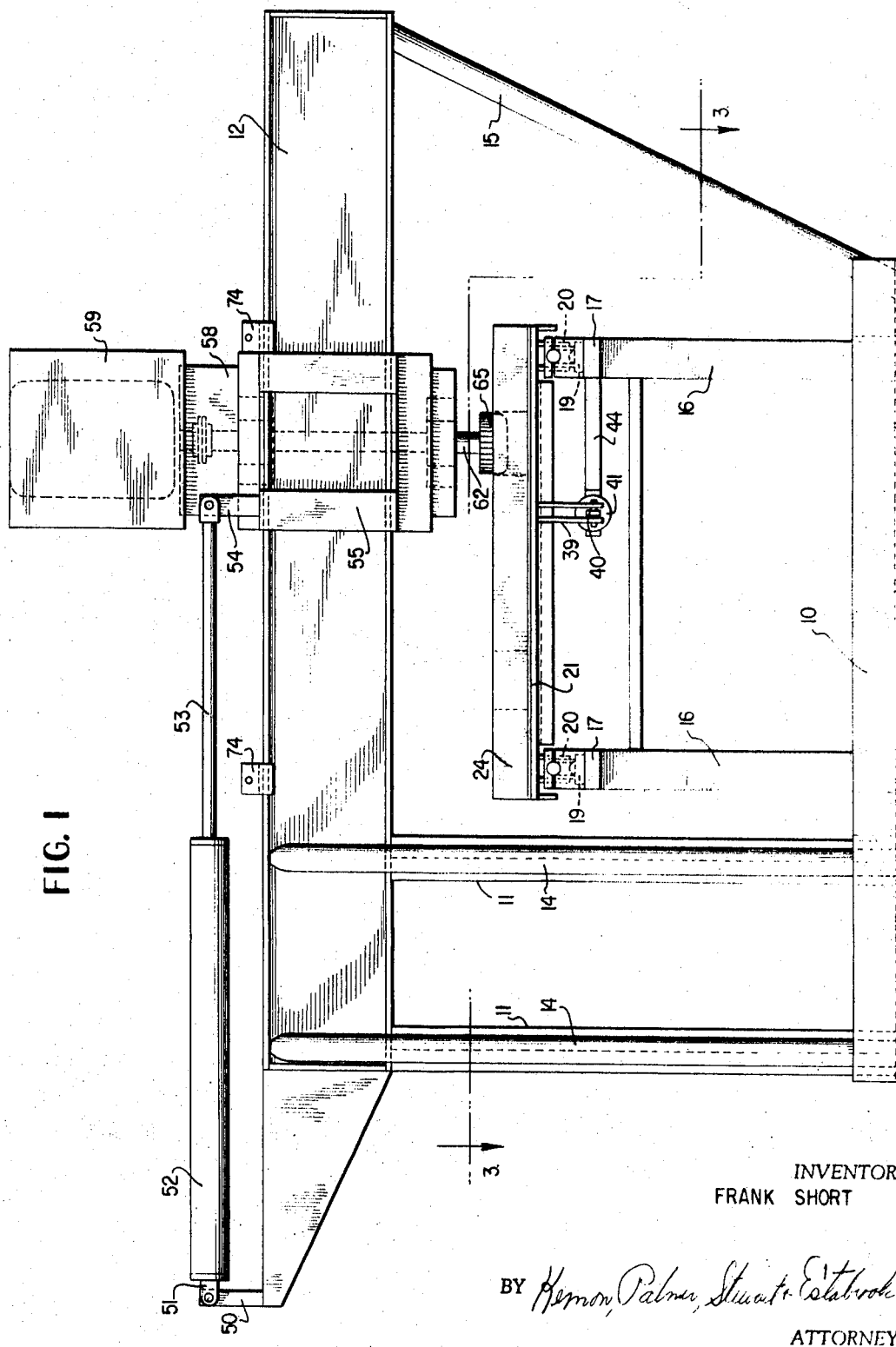
FIG. I
INVENTOR
FRANK SHORT
BY *Kenyon, Palmer, Stewart & Estabrook*
ATTORNEYS.

Oct. 7, 1969　　　　　　　F. SHORT　　　　　　　3,470,924
MACHINE FOR NOTCHING PALLET STRINGERS
Filed Aug. 27, 1965　　　　　　　　　　　　　3 Sheets-Sheet 2

INVENTOR
FRANK SHORT

ATTORNEYS.

Oct. 7, 1969 F. SHORT 3,470,924
MACHINE FOR NOTCHING PALLET STRINGERS
Filed Aug. 27, 1965 3 Sheets-Sheet 3
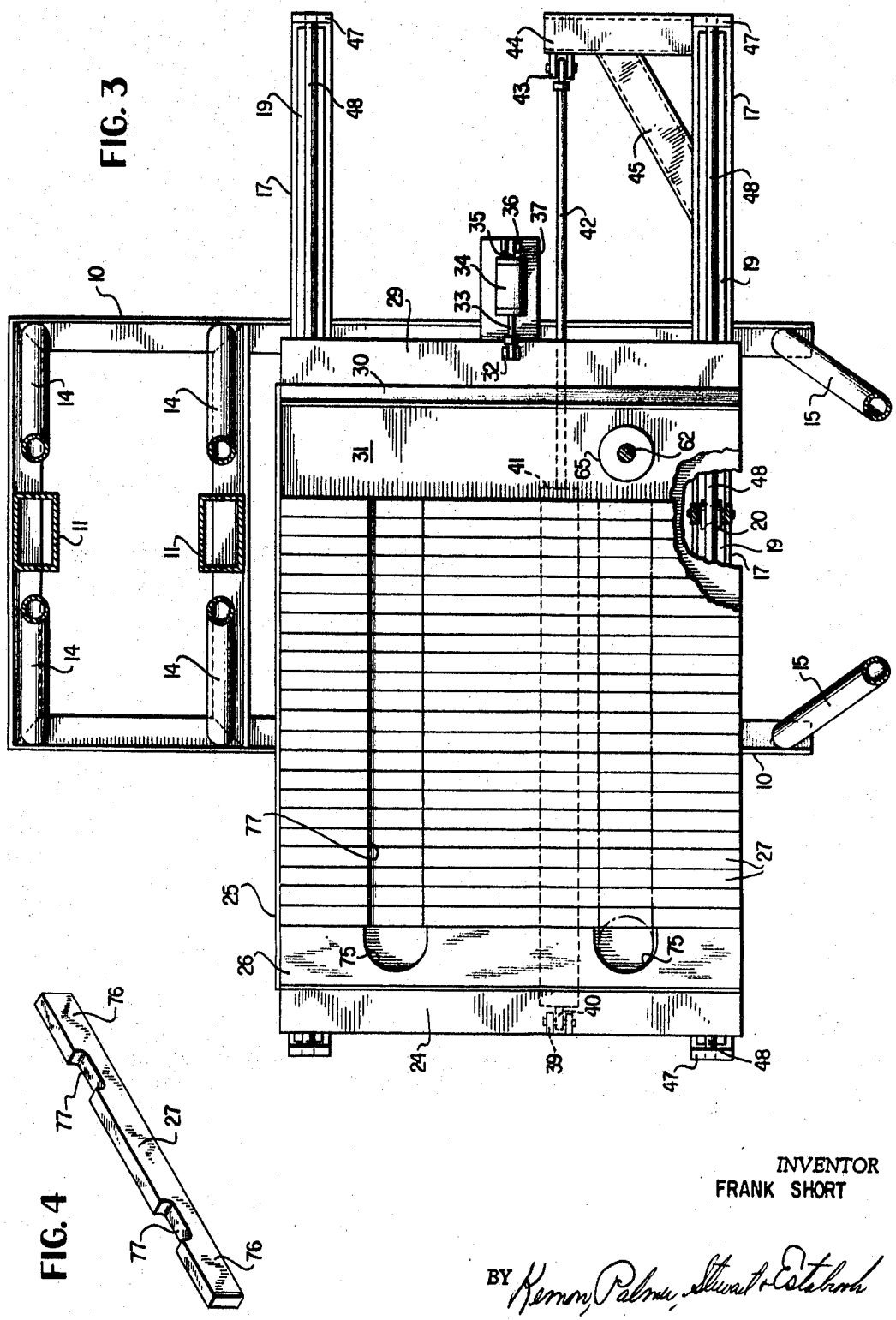
INVENTOR
FRANK SHORT
BY *Kenon, Palmer, Stewart & Estabrook*
ATTORNEYS

United States Patent Office 3,470,924
Patented Oct. 7, 1969

3,470,924
MACHINE FOR NOTCHING PALLET STRINGERS
Frank Short, 2201 Airport Ave.,
Fredericksburg, Va. 22401
Filed Aug. 27, 1965, Ser. No. 483,092
Int. Cl. B27c 5/06
U.S. Cl. 144—133                                   9 Claims

ABSTRACT OF THE DISCLOSURE

A machine for cutting or notching stringers for use in the fabrication of wooden pallets. A plurality of stringers are placed upon a movable platform so that a rotating cutting member can form the notches or cuts therein as the platform is moved beneath the cutting member. The stringers are compressed against one another and against an abutment on the platform by suitable means which prevents the stringers from being split during the cutting operation. This abstract is neither intended to define the invention of the application which, of course, is measured by the claims, nor is it intended to be limiting as to the scope of the invention in any way.

---

The more conventional type of wooden pallet usually consists of a sandwich like structure wherein a plurality of stringer members have secured to their top and bottom surfaces a plurality of slat-like members. The slat-like top and bottom surface members are arranged in a plane transverse to the plane in which the stringers are positioned. The stringers are so spaced that in certain instances only a pair are used and they constitute the sides of the pallet whereas a third stringer would be used in the middle of the pallet for rigidity purposes. In a pallet of the foregoing type, either surface may be used to support a load thereupon and it is customary to move such a loaded pallet by means of a fork-lift truck wherein the tines of said truck may be inserted from either end of the pallet between the top and bottom slat members. If the pallet has a middle or center stringer, the tines are disposed on each side thereof and in bound of the outermost tines. It has been found from experience, however, that it is often highly desirable to be able to lift and transport the pallet by having the tines of the fork-lift truck engage the pallet from one side or the other instead of from an end. This situation arises quite often from the manner in which the material or articles are stacked or placed upon the pallet surface and also from the space restrictions of the area in which the loaded pallet is to be positioned.

In order for a pallet to be engaged from the side and lifted by a fork-lift truck, it is necessary to provide openings in the stringers through which the tines of the fork-lift truck may be inserted. It thus becomes highly desirable to have stringers formed with notches that are of such a size and configuration as to permit the ready insertion and withdrawal of the fork-lift tines so that pallets may be fabricated which can be handled from either side or end. It is essential that the notched area in each pallet be the same in every instance so that the various notches in a plurality of stringers will be in alignment with one another to permit the ready insertion and removal of the tines of the fork-lift truck. While efforts have been directed heretofore to producing stringers with notches therein, such efforts have been very slow and time consuming as in many instances, they consisted of a hand operation or were limited to the cutting of notches in a single stringer at a time. Quite often this type of operation resulted in the notches being formed with ragged edges or splinters and split or damaged end portions which necessitated scrapping the entire stringer.

The inventive concept as embodied in the present machine is such that the machine is readily capable of producing, in a single operation, a notch in a plurality of stringers and then, after an adjustment commensurate with the width or spacing of the tines of a fork-lift truck, to produce in another operation a second notch in the stringers. The manner of notching or cutting the stringers by the machine of the present invention is such as to preclude the splitting or breaking of the portion of the stringer between the outermost edge of the notch and the end of the stringer. In addition, the manner in which the several stringers are positioned and retained upon the bed of the machine tends to insure that the notches will be smooth andclean cut and devoid of splinters, ragged edges and split end portions, while at the same time, permitting a number of stringers to be notched in a single operation.

One of the objects of the present invention is to provide a machine having a plurality of pallet stringers positioned thereon and engaged by a non-traveling rotary cutter for producing in a single operation a notch in each of said stringers.

Another object is to provide a machine having a bed to receive a plurality of pallet stringers with means for clamping and holding said stringers in compressed relation to one another during a notching or cutting operation.

A further object is to provide a machine having a reciprocating bed upon which a plurality of pallet stringers are clamped for engagement with a non-traveling rotary cutter with means at the forward and rearward ends of said bed to receive and guide said cutter while preventing the splitting of the end portions of said stringers.

Still another object is to provide a machine having a reciprocating bed upon which a plurality of pallet stringers are clamped for engagement with a non-traveling rotary cutter with means for supporting and driving said cutter while at the same time permitting its adjustment transversely of said bed whereby a plurality of notches may be formed in each of said stringers.

A still further object is to provide a machine having a reciprocating bed with a plurality of pallet stringers thereon and means at one end of said bed for slidably engaging said stringers to compress and force said stringers against the other end of the bed while moving the bed beneath a rotary cutter to cut notches in said stringers.

Other objects and advantages more or less ancillary to the foregoing in the manner in which all of the various objects are realized will appear in the following description, which, when considered in connection with the accompanying drawings, sets forth the preferred embodiment of the present invention.

Referring to the drawings wherein the preferred embodiment of the invention is illustrated:

FIGURE 1 is a front elevational view of the machine embodying the present invention;

FIGURE 3 is a horizontal sectional view showing a portion of the frame structure and the reciprocating bed, the view being taken on the line 3—3 of FIGURE 1;

FIGURE 4 is a perspective view of a pallet stringer showing the notches formed therein;

Figure 5:
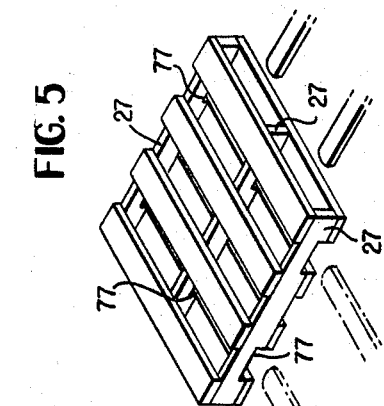
FIGURE 5 is a perspective view of a pallet with notches stringers showing the manner in which the tines of a fork-lift truck may engage the pallet either from the end or side.

Referring to the drawings, there is shown in FIGURE 3 a rectangularly shaped base or supporting structure 10 which is provided at one end portion with a pair of vertically extending columns 11 that have mounted on their upper ends a beam member 12. In addition said end portion of the base 10 is provided with a plurality of bracing members 14 that are suitably secured to the base and beam member. The other end of the base 10 has secured thereto a pair of tubular supporting elements 15 that are interposed between and connected to the ends of said base and the beam member 12 to securely maintain said beam in spaced parallel relation to the base with the longitudinal axis of the beam lying in the median plane of said base. The base 10 has secured thereto by any suitable means, not shown, a plurality of spaced stanchions 16, FIGURE 3, which are arranged in pairs for supporting on their upper ends of a pair of elongated bar members 17 that are disposed in spaced parallel relation to one another. The bar members 17 are of such a length as to project beyond the stanchions 16, while said stanchions are provided with suitable braces 18 to insure that the bars 17 are not only maintained in spaced parallel relation but also are provided with a firm sound base that is devoid of any movement. The bars 17 have mounted on their upper surfaces elongated tracks 19 which are engaged by the depending rollers 20 that are mounted on or carried by the bottom surface of a bed or platform 21.

Figure 2:
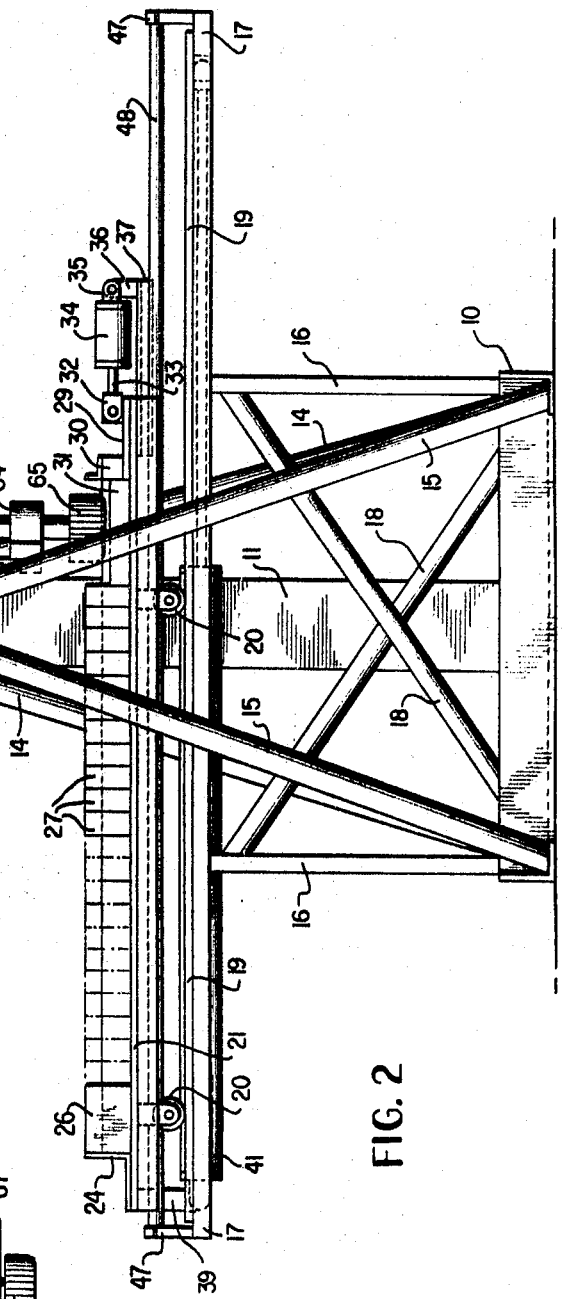
FIGURE 2 is a side elevational view of the machine showing the stringer members mounted on the reciprocating bed.

The left-hand end portion of the bed or platform 21, as viewed in FIGURE 2, has mounted on the upper surface thereof an angled plate member 24. The bed or platform is also provided, along one side thereof, with a vertically extending border or edge member 25, FIGURE 3, which in conjunction with the plate member 24 serve as abutments or positioning members in placing the pallet stringers upon said bed or platform. In addition, the bed or platform 21 is provided with a block or buffer member 26, which engages the plate member 24 throughout its length and a portion of the edge member 25. The block or buffer member 26 constitutes an abutment or limit stop member against which wooden stringers 27 are continuously urged under pressure during the entire cutting or notching operation. The stringers 27 are usually formed from conventional 2 by 4 stock, that has been cut to the prescribed length, so that they may be placed on their narrow edges upon the bed or platform 21 with an end of each stringer engaging the edge member 25. The edge member 25 in conjunction with the buffer member 26 tends to facilitate the ready and proper placing of the stringers upon the bed or platform prior to said stringers being compressed against one another and the buffer member 26 to insure their retention on said platform.

The right-hand end of the bed or platform 21, as viewed in FIGURE 2, has slidably mounted thereon in suitable guideways, not shown, a transversely extending plate 29, which is provided with a vertically extending flange or abutment 30 that in turn engages a spacer block 31, which is slidably positioned upon the bed or platform 21. The plate 29 has secured thereto by a suitable bracket 32 a piston rod 33, which in turn is provided with a piston, not shown, that is disposed within the cylinder 34. The cylinder 34 has a lug 35 thereon which is pivotally connected to a bracket 36 that is mounted upon a support 37 which is connected to and carried by the platform 21. Thus, through the movement of the piston and piston rod 33 with respect to the cylinder 34, the transverse plate 29 can be moved towards the opposite end of the platform 21 for the purpose of forcing the stringer members 27 towards the buffer member 26, which action results in the clamping and compressing of said stringer members with one another between the buffer block and the spacer block 31. Through the action of the piston within the cylinder housing 34, the plate 29 and spacer block 31 are continuously being urged into engagement with the stringers on the bed or platform 21 for compressing said stringers into engagement with one another and against the block or buffer member 26 at the opposite end of the bed or platform. Thus, during the cutting or notching operation, the stringers are continuously maintained under compression between the buffer member 26 and the spacer block 31 due to the action of fluid upon the piston in the cylinder 34.

The plate member 24 mounted on the front or left end of the platform 21 is provided with a pair of spaced depending bars or members 39 which have pivotally connected to their lower ends a bracket member 40. The bracket 40 is secured or affixed in any suitable manner to one end of a cylinder 41 that extends beneath the bed or platform 21 for substantially its entire length. A piston, not shown, is disposed with said cylinder and a piston rod 42 projects from the cylinder 41 and is pivotally connected to a bracket 43, FIGURE 3, that in turn is mounted on a suitable support 44 which is affixed to one of the bar members 17 in a plane normal thereto. A suitable angle brace 45 is interposed between the support 44 and the bar member 17 to provide a rigid anchoring member for the piston rod 42 during the reciprocatory movement of the cylinder 41 and platform 21. The elongated bar members 17 are provided, at their respective ends, with vertically extending abutments or supports 47, for receiving and holding the ends of rod members 48 that are interposed between the rollers 20 and the bed or platform 21. The rod members 48 constitute supporting guides for the bed or platform during its reciprocatory movement while at the same time insuring the retention of the rollers 20 on the tracks 19.

The beam member 12 is provided at one end with a vertically extending support 50, FIGURE 1, to which is pivotally connected a bracket 51, that is affixed to a cylinder 52. The cylinder 52 is provided with a suitable piston, not shown, which has a piston rod 53 extending from said cylinder. The piston rod 53 is pivotally connected to an arm 54 that is affixed to a housing structure 55, FIGURE 2, which substantially encompasses the beam member 12 for sliding movement thereon. The front or forward face portion of the housing 55 is provided with a pair of inturned edge or end portions 57, FIGURE 6, which define guideways for a vertically extending plate member 58. The plate member 58 is provided at its upper end with an offset segment or portion 59 which constitutes a partial enclosure and support for an electric motor 60. The motor 60 is mounted in the offset portion 59 so that the motor shaft 61 is arranged in a depending manner in a plane normal to the path of movement of the bed or platform 21. The motor shaft 61 is connected to a drive shaft 62 by a suitable coupling 63 and said drive shaft is provided with a pair of spaced bearing supports 64 which are affixed to and carried by the plate member 58. The lower end of the drive shaft 62 has mounted thereon a circular cutting head 65, which is provided with a plurality of spaced radially projecting cutting members, not shown, which may be adjustably mounted within said head. The housing structure 55 is provided with suitable clamping means, not shown, which engage the plate member 58 for adjustably positioning same within the guideways 57 and thus, provide means for varying the positioning of the circular cutting head 65 with respect to the stringers 27 and the bed or platform 21 and thus, determine the depth of the cut or notch that is formed in the stringers 27.

Figure 6:
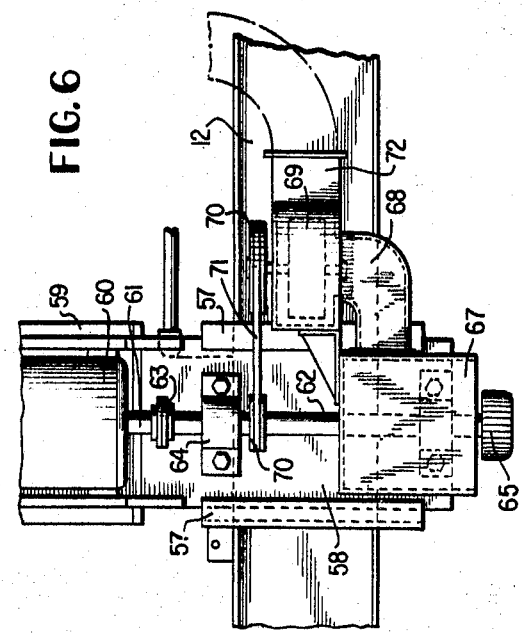
FIGURE 6 is a fragmentary elevational view of the rotary cutter and its motor together with a blower exhaust mechanism.

The lower portion of the plate member 58 has mounted thereon a hood 67, FIGURE 6, which is disposed in close proximity to the circular head 65. The hood 67 is provided with a discharge conduit 68, which has mounted therein a rotatable fan member 69 which is connected to the drive shaft 62 by suitable pulleys 70 and belt 71. Thus, as the drive shaft 62 is rotated by the motor 60, the fan 69 will be driven through pulleys 70 and belt 71 so as to withdraw through the hood 67 and conduit 68 the dust and wood chips produced by the engagement of the cutting members with the stringers 27 and said dust and wood chips can be delivered through the conduit 72 to a suitable receptacle, not shown. The beam member 12 is provided with a plurality of limit stop members 74, which are adjustably secured to said beam to limit the movement of the housing structure 55 and its associated mechanism along said beam whereby the circular cutting head 65 can be brought into proper position and alignment with the arcuate recesses 75 in the block member 26 for cutting several rows of notches in a plurality of stringers that are clamped upon the bed or platform 21. The machine of the present invention is provided with a suitable hydraulic or fluid pressure system embodying a motor and pump, not shown, which in turn are connected by fluid lines, not shown, to the cylinders 34, 41 and 52 so that upon the actuation of suitable controls, not shown, associated with the pump, the pistons carried on the ends of the piston rods within the respective cylinders may be advanced or retracted to perform a prescribed operation.

In the use of the machine of the present invention, the stringers 27 having been cut to the required length from conventional 2 by 4 stock are placed on edge upon the bed or platform 21 with one end of each stringer being positioned in abutting engagement with the vertical edge member 25 provided along one side of the bed or platform 21. The vertical edge member 25 tends to facilitate the rapid loading of the stringers upon the bed or platform while at the same time serving as a limit stop member in properly positioning the stringers upon said bed. With the bed or platform loaded with stringers 27, fluid under pressure is delivered to one end of the cylinder 34 for actuating the piston therein and causing the piston rod 33 to be moved towards the bed or platform 21 which movement causes a complementary movement of the plate 29 and flange portion 30 into engagement with the spacer block 31, which in turn engages the stringers 27 so as to force them forwardly on the bed 21 against the block member 26. The piston within the cylinder 34 is continuously maintained under a head of pressure during the entire cutting or notching operation so that the stringers 27 are retained in a compressed or compacted state between the spacer block 31 and the block member 26.

The limit stop members 74 having been manually set upon the beam member 12, the piston in the cylinder 52 is then subjected to a suitable head of pressure so as to move the housing structure 55 and the motor and cutting head 65 into engagement with the limit stop member 74 shown at the right end portion of the beam 12 in FIGURE 1 and thereby bring the cutting head into alignment with the recess 75 in block member 26. The piston within the cylinder 52 is continuously maintained under a suitable head of fluid pressure to insure the retention of the housing structure 55 in engagement with the limit stop member 74 during the entire cutting operation, and with the housing structure in engagement with said limit stop member, the motor 60 is energized so as to rotate the circular cutting head 65. It is to be noted in FIGURE 2 that the spacer block 31 is of a thickness approximately half that of the stringers 27, which permits the cutting head to be so positioned as to have a free and uninterrupted rotary motion with respect to the spacer block 31, but upon engaging the stringers 27, it will cut a notch therein which is of a depth slightly less than one half of the thickness of said stringer, FIGURE 4. The depth of the notch that is cut in the stringers 27 can be varied by the vertical positioning of the plate member 58 within the guideways 57 of the housing structure 55, which results in the motor 60, drive shaft 62 and cutter head 65 being raised or lowered with respect to the platform or bed 21. With the stringers 27 under compression between the spacer block 31 and the end block or buffer member 26 due to the action of the piston within the cylinder 34, and with the cutting head 65 being rotated by the motor 60, the bed or platform 21 is then moved from the left to the right, as viewed in FIGURES 2 and 3 by delivering fluid under pressure to the cylinder 41 so that said fluid can act on the piston in said cylinder and move the cylinder 41 and bed 21 from left to right. Upon the movement of the bed 21, the cutting members on the circular head 65 will be brought into engagement with the stringers 27 for cutting a notch in each stringer as the bed continues to move from the left to the right and as shown in FIGURE 3, the end block or buffer member 26 is provided with arcuate recesses or indentations 75, which are adapted to receive the cutting head after it has moved through the stringer adjacent to the end block or buffer member 26. During the time that the bed is moved from the left to the right and the notches are being cut in the stringers by the cutting head 65, the fan member 69 will be rotatably driven by the pulleys 70 and belt 71 for withdrawing the dust and chips from the stringers 27 and blowing same through the conduit 72 to a suitable receptacle or container.

When the cutting head 65 reaches the recess 75, the fluid being delivered to the cylinder 41 and acting upon the piston therein is delivered to said cylinder so as to act upon the opposite face of said piston in order to effect movement of the bed or platform from the right to the left as viewed in FIGURE 2 or 3 or to return the bed or platform to its initial position. Upon said bed or platform being returned to its initial or starting position, fluid is then delivered to the cylinder 52 to engage the opposite face of the piston therein so as to retract the piston rod 53 within the cylinder 52 and draw the housing structure 55 into engagement with the limit stop member 74 positioned on the beam 12 adjacent the left end of said beam as viewed in FIGURE 1. Upon said housing structure 55 engaging the other limit stop member 74, the bed or platform 21 is moved once again from the left to the right as viewed in FIGURE 2 or 3 so that a second notch may be cut in the stringers in the same manner in which the first notch was cut and upon the completion of the cutting of the second notch, the bed is returned to is initial position. When the bed is returned to its intial position after the second cutting operation, the flange member 30 and plate 29 are retracted from their engagement with the spacer blocks 31 by means of fluid pressure being delivered to the opposite face of the piston within the cylinder 34 whereby the stringers may then be removed from the bed or platform 21.

During the cutting or notching operation, the pressure that is exerted upon the spacer block 31 by the plate 29 and flange 30 maintains the stringers in compressed engagement with one another and against the end block or buffer member 26 so that being compactly compressed and retained under compression, the end portions 76 of the stringers will not split or crack. Furthermore, the retention of the stringers in compressed engagement with one another throughout the length of the bed 21 insures that each notch as cut in each stringer will be a smooth and clean cut so that the edges of each notch will not be gouged or torn or have fragments of the stringer projecting therefrom so as to result in a rough and uneven cut, which could readily result in weakening the stringer and also hinder the operation of assembling and manufacturing the pallet. The compressing of the various stringers into engagement with one another and forcing all of the stringers towards the end block or buffer member 26 by means of the plate and flange member 30 tends to retain said stringers in a position or manner that would simulate a single member rather than a plurality of relatively thin individual members so that as the circular cutting head 65 moves through the various stringers 27, the notch 77 that is produced in each stringer will be smooth and clean cut and completely devoid of splinters or broken and ragged edge portions.

Thus, through the provision of notches 77 in the stringers 27 a pallet fabricated from such stringers, FIGURE 5, will permit the tines of a fork-lift truck to engage the pallet structure from either end thereof or from either side, which arrangement greatly enhances the versatility of the pallet structure with respect to the placing of a load thereon and also with respect to the positioning and stacking of a loaded pallet within a warehouse or similar area.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. A machine for cutting notches in stringers for a pallet comprising a base and a supporting member arranged in spaced parallel relation to one another, a platform slidably supported on said base, an elongated limit stop member positioned across an end of said platform and having a flat face, a member slidably mounted on said supporting member, a depending power driven rotary shaft mounted on said member, a circular cutting head secured to said shaft in spaced parallel relation to said platform, a plurality of stringers positioned on said platform, fluid actuated means carried by the other end of said platform for compressing said stringers into engagement with one another and against the flat face of said limit stop member, means mounted on said first mentioned end of said platform for reciprocating said platform intermediate said base and supporting member in a plane normal to said shaft for moving said stringers into engagement with said cutting head to cut a notch in each of said stringers while retaining said stringers in compression with one another and against said base of said limit stop member, said limit stop member having spaced recesses in said face to receive said cutting head to permit the cutting of a notch in the stringer immediately adjacent said limit stop member and means for moving said member on said supporting member to bring said head into position for engaging said stringers to cut a second notch therein spaced from the first notch upon movement of said platform.

2. A machine for cutting notches in stringers for a pallet comprising a base and a beam member arranged in spaced parallel relation to one another, a platform slidably mounted on said base beneath said beam, an abutment of a length equal to the width of said platform secured to an end of said platform, said abutment having at least one recess formed in a surface thereof, a plurality of stringers positioned on said platform, a plate of a length equal to the width of said platform slidably mounted on said platform, fluid pressure actuated means carried by an end of said platform and connected to said plate for moving same over said platform and into engagement with said stringers to compress same into engagement with one another and said abutment, a motor having a depending drive shaft supported on said beam, a circular cutting head mounted on said drive shaft for rotation in the plane of movement of said platform, and fluid pressure actuated means connected to the other end of said platform for moving said platform beneath said cutting head to cut a notch in each stringer on said platform with said recess receiving said cutting head.

3. A machine for cutting notches in stringers for a pallet comprising a base, a beam member supported by said base in spaced parallel relation thereto, a platform supported on said base beneath said beam for reciprocatory movement in a plane transverse to the longitudinal axis of said base and beam, a block member of a length equal to the width of said platform secured to an end of said platform, said block member having a pair of spaced arcuate recesses formed in the face thereof remote from said end of platform, a plurality of stringers positioned on said platform, a flanged plate of a length equal to the width of said platform slidably mounted on said platform, fluid pressure actuated means secured to one end of said platform and connected to said plate for moving same over said platform and into engagement with said stringers to compress said stringers into engagement with one another and into engagement with said face of said block member, a housing member slidably mounted on said beam, a motor having a depending drive shaft supported on said housing, a circular cutting head mounted on said drive shaft for rotation in the plane of movement of said platform, fluid pressure actuated means connected to the other end of said platform said platform for reciprocating same beneath said beam member to move said cutting head through said stringers and into one of said recesses in said block member, said circular head cutting a smooth notch in each stringer adjacent an end thereof free of splinters while said stringers are maintained under compression to insure that said ends remain intact and devoid of cracks.

4. A machine for cutting notches in stringers for pallets as set forth in claim 3 wherein said beam member is provided with a plurality of limit stop members engaged by said housing to align said cutting head with an arcuate recess in said block member.

5. A machine as set forth in claim 3 in which said base has a pair of spaced parallel bar members mounted thereon, an elongated track affixed to each of said bar members and depending rollers secured to said platform and engaging said tracks.

6. A machine as set forth in claim 3 wherein said base has a pair of spaced parallel bar members mounted thereon, an elongated track affixed to each of said bar members, an upstanding projection formed at the ends of said bar members, a rod affixed to the projections of each bar member and arranged in spaced relation to said track, depending rollers carried by said platform and interposed between said track and rod on each bar member for supporting said platform during its reciprocatory movement.

7. A machine as set forth in claim 3 wherein a hood structure is supported on said housing adjacent said cutting head, a conduit connected to said hood, a rotatable fan in said conduit, means connected to said drive shaft for rotating said fan to collect and discharge the dust and chips from the area in which said cutting head rotates.

8. A machine for cutting notches in stringers for a pallet comprising a base, a beam member supported by said base in spaced parallel relation thereto, a platform supported on said base beneath said beam for reciprocatory movement in a plane transverse to the longitudinal axis of said base and beam, a block member positioned on said platform at one end thereof, said block member having a pair of spaced arcuate recesses formed in one face thereof, a plurality of stringers positioned on said platform, a flanged plate slidably mounted on said platform, fluid pressure actuated means connected to said plate for moving same into engagement with said stringers to compress said stringers into engagement with one another and into engagement with said face of said block member, a housing member slidably mounted on said beam, a plurality of limit stop members positioned on said beam, fluid pressure actuated means connected to said housing for moving same into engagement with a stop member, a vertically extending plate member adjustably mounted on said housing, said plate member having an offset portion, a motor mounted on said offset portion, a depending drive shaft connected to said motor and mounted in bearing supports on said plate member, a circular cutting head affixed to said drive shaft for rotation in the plane of movement of said platform, fluid pressure actuated means connected to said platform for reciprocating same beneath said beam to move said cutting head through said stringers and into one of said recesses contemporaneous with cutting a smooth notch in each stringer free of splinters and devoid of cracks in the end portions of said stringers while maintaining said stringers in a compressed status.

9. A machine for cutting notches in stringers as set forth in claim 2 wherein a vertically extending member is secured to and extends along a side edge of said platform, said vertically extending member engaging an end of each stringer positioned on said platform.

References Cited

UNITED STATES PATENTS

| 1,113,798 | 10/1914 | Lohnes et al. | 144—133 |
| 1,839,599 | 1/1932 | Schimmel | 144—133 |
| 1,890,824 | 12/1932 | Offutt | 90—34 |
| 2,353,794 | 7/1944 | Svikhart | 144—133 |
| 2,778,193 | 1/1957 | Stockett | 143—108 |
| 3,167,260 | 1/1965 | Gibbons et al. | 144—252 |

DONALD R. SCHRAN, Primary Examiner

U.S. Cl. X.R.

144—136